United States Patent [19]

Huang et al.

[11] Patent Number: 5,375,683
[45] Date of Patent: Dec. 27, 1994

[54] CONTROLLABLE VIBRATION DAMPER FOR MOTOR VEHICLES

[75] Inventors: Zhen Huang, Schwelm; Hans J. Betsch, Kamen; Hans Scheerer, Esslingen; Andreas Opara, Fellbach; Walter Schulz, Stuttgart; Klaus Schmidt, Bergisch Gladbach, all of Germany

[73] Assignees: August Bilstein GmbH & Co. KG, Ennepetal; Mercedes Benz AG, Stuttgart, both of Germany

[21] Appl. No.: 164,418

[22] Filed: Dec. 9, 1993

Related U.S. Application Data

[63] Continuation-in-part of Ser. No. 4,938, Jan. 15, 1993, abandoned.

[30] Foreign Application Priority Data

Jan. 17, 1992 [DE] Germany ............................. 4201200
May 22, 1992 [DE] Germany ............................. 4216987

[51] Int. Cl.$^5$ ................................................. F16F 9/46
[52] U.S. Cl. ........................................ 188/299; 188/318; 188/322.13
[58] Field of Search ............. 188/299, 287, 318, 316, 188/313, 314, 315, 322.13, 322.14, 322.15, 322.22, 281, 282, 280, 311, 322.19; 280/707, 714

[56] References Cited

U.S. PATENT DOCUMENTS

| | | | |
|---|---|---|---|
| 4,650,042 | 3/1987 | Knecht et al. | 188/299 |
| 4,802,561 | 2/1989 | Knecht et al. | 188/299 |
| 4,960,188 | 10/1990 | Wossner | 188/299 |
| 4,986,393 | 1/1991 | Preukschat et al. | 188/299 |
| 5,180,039 | 1/1993 | Axthammer et al. | 188/299 |

FOREIGN PATENT DOCUMENTS 3800288 6/1989 Germany ............................. 188/299

*Primary Examiner*—Douglas C. Butler
*Attorney, Agent, or Firm*—Max Fogiel

[57] ABSTRACT

A variable dashpot for motor vehicles. It comprises a vibration-suppressing piston-and-cylinder mechanism. The cylinder contains displacement fluid. The piston divides the cylinder into two displacement compartments. The piston has a piston rod attached to it. The piston is provided with pressure-dependent valves that vary the level of vibration suppression. The vibration-suppression valve system has two vibration-suppressing valves (2) accommodated in alignment in a cylindrical valve housing (1). Each vibration-suppressing valve consists of an axially displaced electromagnetic plunger (5 or 6) that operates in conjunction with at least one outlet (3 or 4) and of at least one pressure-sensitive valve (7 or 8) on stream parallel or in alignment with the plunger.

31 Claims, 15 Drawing Sheets

CONTROLLABLE VIBRATION DAMPER FOR MOTOR VEHICLES

The present application is a Continuation-In-Part of the parent application Ser. No. 004,938 filed Jan. 15, 1993, now abandoned.

BACKGROUND OF THE INVENTION

The invention concerns a variable dashpot for motor vehicles. It comprises a vibration-suppressing piston-and-cylinder mechanism. The vibration-suppression cylinder contains displacement fluid. The piston divides the cylinder into two displacement compartments. The piston has a piston rod attached to it. The piston is provided with pressure-dependent valves that vary the level of vibration suppression.

Such a variable dashpot is known from German OS 3 434 877. It has a bypass valve that parallels the cylinder. The bypass valve has two components. The first is an axially moving variable valve body that operates in conjunction with an outlet. The second component is at least one pressure-sensitive, spring-loaded valve downstream of the valve body. This dashpot has a serious drawback however. The bypass valve can provide only two vibration-suppression characteristic curves in either the vacuum stage or the compression stage.

A two-tube dashpot with a four-stage level of vibration suppression is disclosed in German Patent 3 631 714 C2.

One variable bypass valve between the two displacement compartments generates two vibration-suppression curves in either the vacuum or the compression stage. Another bypass valve between the lower displacement compartment and an equalization compartment allows four different ways of setting the level of vibration suppression. This dashpot also has drawbacks. First, it has a very long inactive stroke section, especially when both valves are positioned inside it. Second, it is complicated and has many components.

SUMMARY OF THE INVENTION

The object of the present invention is to make it possible to set the level of vibration suppression in either the vacuum or the compression stage with only one vibration-suppression valve, different embodiments of which can be installed in either a single-tube or a double-tube dashpot system.

The variable vibration-suppression valve system employed in the variable dashpot in accordance with the invention consists of two vibration-suppression valves accommodated in alignment in a cylindrical housing. Each vibration-suppression valve consists of two components. The first is an electromagnetically activated axially displaced plunger that operates in conjunction with at least one outlet. The second component is at least one pressure-sensitive valve paralleling or downstream of the plunger.

The vibration-suppression valve system in one embodiment of the invention varies the cross-section of a bypass channel that the dashpot's displacement compartments communicate through.

When the vibration-suppression valve system is employed in a two-tube dashpot, the vibration-suppression valve system varies the cross-section of a bypass channel that one of the dashpot's displacement compartments communicates with an equalization compartment through, whereby the bypass channel can be between either the upper or the lower displacement compartment and the equalization compartment.

When the vibration-suppression valve system is employed to vary the level of a vibration suppression in a dashpot, one of the displacement compartments in the cylinder will communicate through the system with an external reservoir for compressed fluid.

The bypass channel in one simple embodiment of the invention is demarcated by a tube surrounding the valve housing and communicates with outlets controlled by the plunger.

The bypass channel in another embodiment has at least one outlet between the pressure-sensitive valves to inside the valve.

The bypass channel controlled by the vibration-suppression valve system in another embodiment of the invention is demarcated by a tube around the dashpot cylinder or, if the dashpot has two tubes, around the outer cylinder.

The variable bypass channel in one simple and cost-effective embodiment of the invention consists of a tube inside the valve housing between the plunger-controlled outlets that has at least one outlet to the inside of the valve between the pressure-sensitive valves.

The axially displaceable plungers are activated by electromagnets, and, in one advantageous embodiment, the plungers constitute the armatures of the electromagnets.

To ensure continued operation during a power failure or other malfunction in activation of the electromagnets in conventional parallel vibration-suppression valves, the plungers can be subjected to the force of a spring to ensure that they will block off the outlets into the bypass channel in the absence of electricity.

The vibration-suppression valve system in one significant embodiment has two bores that can be subjected to force from either upstream or downstream.

The fluid can enter the pressure-sensitive valves in the vibration-suppression valve system from either direction, and at least one spring-loaded valve is associated with each direction.

One advantage of a vibration-suppression valve system mounted in a valve housing in accordance with the invention is that it can attain four vibration-suppression level curves in the vacuum stage and four essentially independent such curves in the compression stage.

Another advantage is that the vibration-suppression valve system can be piggybacked directly to the dashpot or to any other site on the vehicle.

BRIEF DESCRIPTION OF THE DRAWINGS

Embodiments of the invention will now be specified with reference to the drawing, wherein.

DESCRIPTION OF THE PREFERRED EMBODIMENTS

Figure 1:
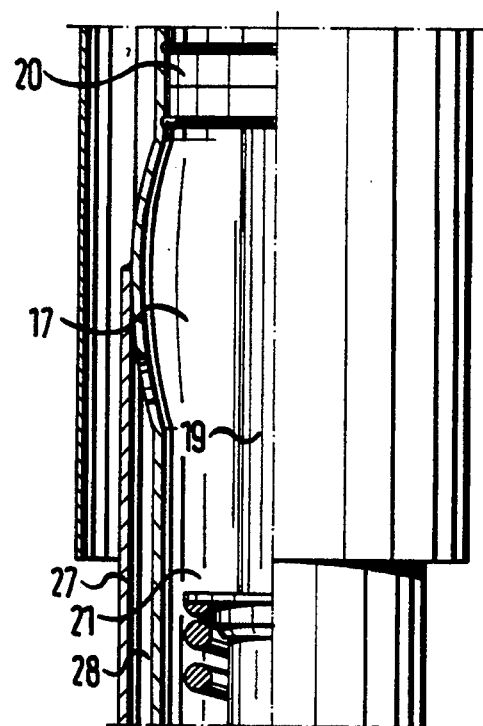
FIG. 1 illustrates a single-tube dashpot with two displacement compartments that communicate through a bypass.
Figure 1:
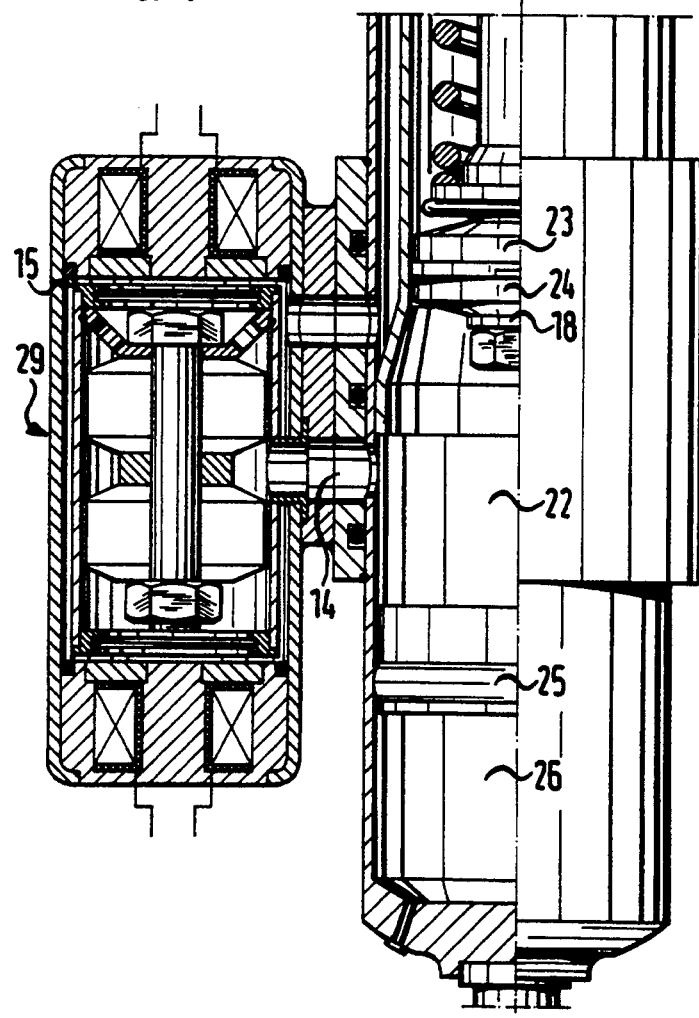

The variable single-tube dashpot illustrated in FIG. 1 consists essentially of a vibration-suppressing cylinder 17 and piston 18. Vibration-suppressing piston 18 has a piston rod 19 attached to it, slides in and out of cylinder 17, and is provided with pressure-sensitive vibration-suppression valves 23 and 24. Piston rod 19 is positioned and sealed off by a seal 20 in cylinder 17. Cylinder 17 contains a vibration-suppressing fluid. Vibration-suppressing piston 18 divides the cylinder into an upper displacement compartment 21 and a lower displacement compartment 22. Lower displacement compartment 22 is separated from an equalization compartment 26 by a partitioning piston 25. Partitioning piston 25 is loosely secured in the wall of cylinder 17, allowing displacement of oil by the entering piston rod 19. The diameter of cylinder 17 is shorter where vibration-suppressing piston 18 enters and leaves than outside that area. The cylinder is surrounded at this point by a tube 27. Between cylinder 17 and tube 27 is an annular gap 28. A vibration-suppression valve system 29 is flanged directly to the dashpot, allowing a bore 15 to communicate with upper displacement compartment 21 and another bore 14 to communicate with lower displacement compartment 22 through annular gap 28.

Figure 2:
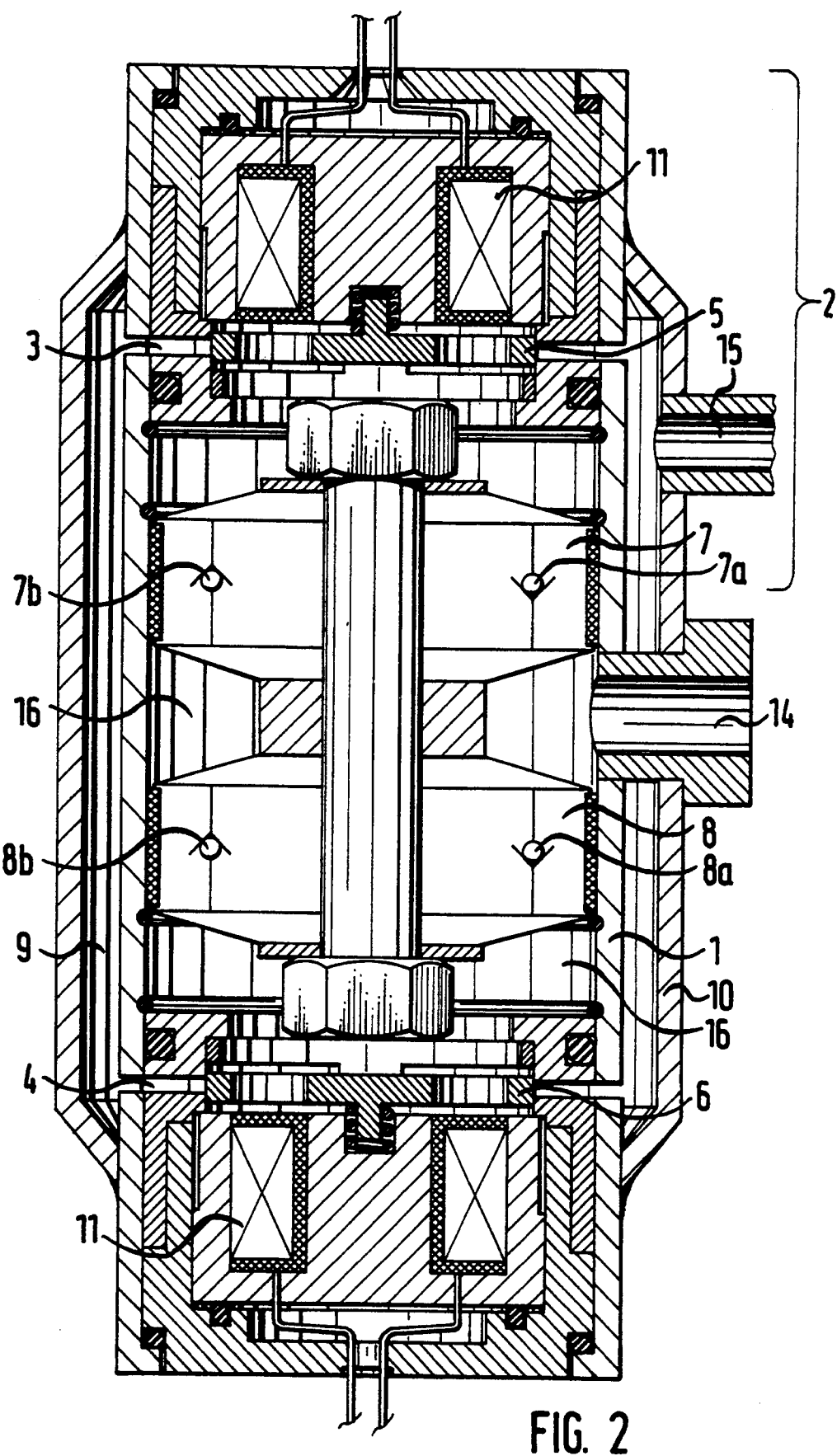
FIG. 2 illustrates a vibration-suppression valve system with fluid flowing through pressure-sensitive valves in alignment with the axially displaced plungers.

FIG. 2 illustrates a vibration-suppression valve system with fluid flowing through pressure-sensitive valves 7 and 8 aligned with axially displaced plungers 5 and 6. The vibration-suppression valve system consists of a cylindrical valve housing 1 that accommodates two aligned vibration-suppressing valves 2, one operating upstream and the other downstream. Each vibration-suppressing valve 2 consists of an axially displaced electromagnetic plunger 5 or 6 that operates in conjunction with at least one pressure-sensitive valve 7 or 8 aligned with the plunger. Each pressure-sensitive valve 7 and 8 consists of two resilient-disk valves 7a and 7b or 8a and 8b, two operating upstream and two downstream. How far resilient-disk valves 7a and 7b or 8a and 8b open depends on the pressure exerted by the fluid. The vibration-suppression level curves can be extensively modified by the extensively varying the type of valve body 13 and resilient-disk valves employed. Each plunger 5 or 6 is axially displaced by an electromagnet 11. Each electromagnet 11 comprises a coil and an armature. The plungers block outlets 3 and 4 when there is no current in the electromagnets and unblock them in the presence of current. When there is a malfunction, in the event of a power failure or broken cable for example, the level of vibration suppression will accordingly be shifted automatically to the hardest characteristic curve. Housing 1 is surrounded by a tube 10, leaving between them a bypass channel 9 in the form of an annular gap. Bypass channel 9 communicates with the inside 16 of the valve through outlets 3 and 4.

The vibration-suppression valve system varies the communication between the dashpot's displacement compartments by way of bores 14 and 15. Bypass channel 9 communicates with annular gap 28 through bore 15 and lower displacement compartment 22 with the inside 16 of the valve through bore 14.

Figure 3D:
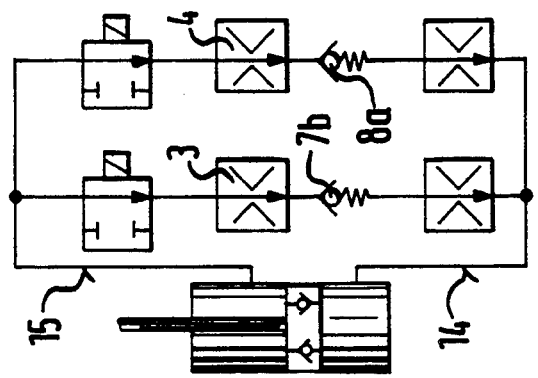
FIGS. 3a, 3b, 3c and 3d illustrate how the vibration-suppression valve system illustrated in FIG. 2 operates in the vacuum stage.
Figure 3C:
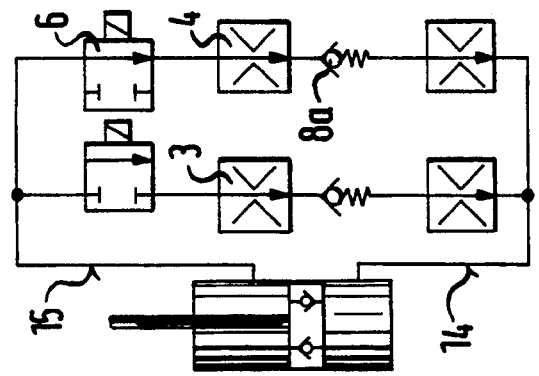
Figure 3B:
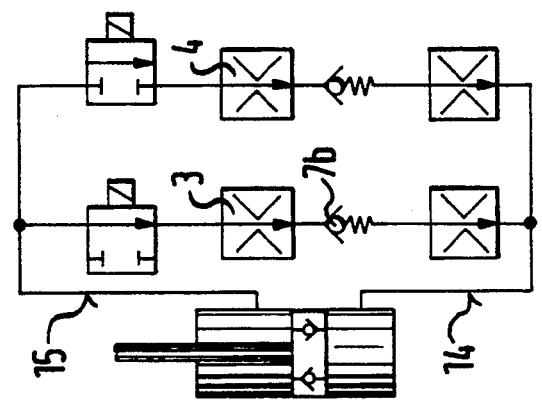
Figure 3A:
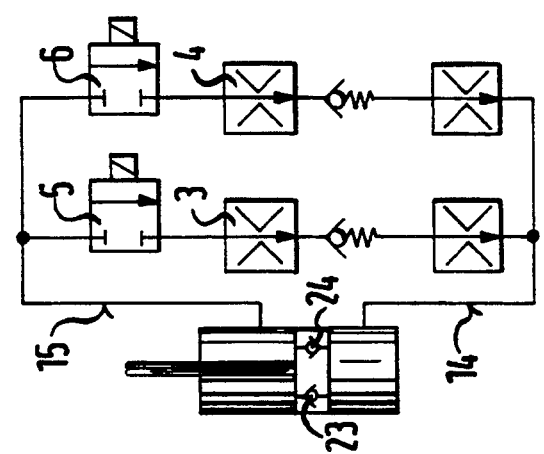

FIGS. 3a and 3b illustrate how the vibration-suppression valve system illustrated in FIG. 2 operates during the vacuum stage. Bore 15 is an intake and bore 14 an outlet bore during the vacuum stage and vice versa during the compression stage.

The vibration-suppression valve system functions as a bypass valve. With outlets 3 and 4 blocked by plungers 5 and 6 as illustrated in FIG. 3, the system is completely disengaged. The only valves in operation are the pressure-sensitive vibration-suppression valves 23 and 24 in vibration-suppressing piston 18. FIG. 3b shows outlet 3 open. The fluid can now flow through bore 15, outlet 3, and resilient-disk valve 7b into bore 14 and hence into the dashpot's lower displacement compartment. When plunger 6 unblocks outlet 4 and outlet 3 is closed (FIG. 3c), fluid will flow into bore 14 through bypass channel 9, outlet 4, and resilient-disk valve 8a. The softest level of vibration-suppression curve is attained when outlets 3 and 4 are open FIG. 3d). The fluid will enter through bore 15 and flow into bore 14 through outlets 3 and 4 and resilient-disk valves 7b and 8a.

Figure 4:
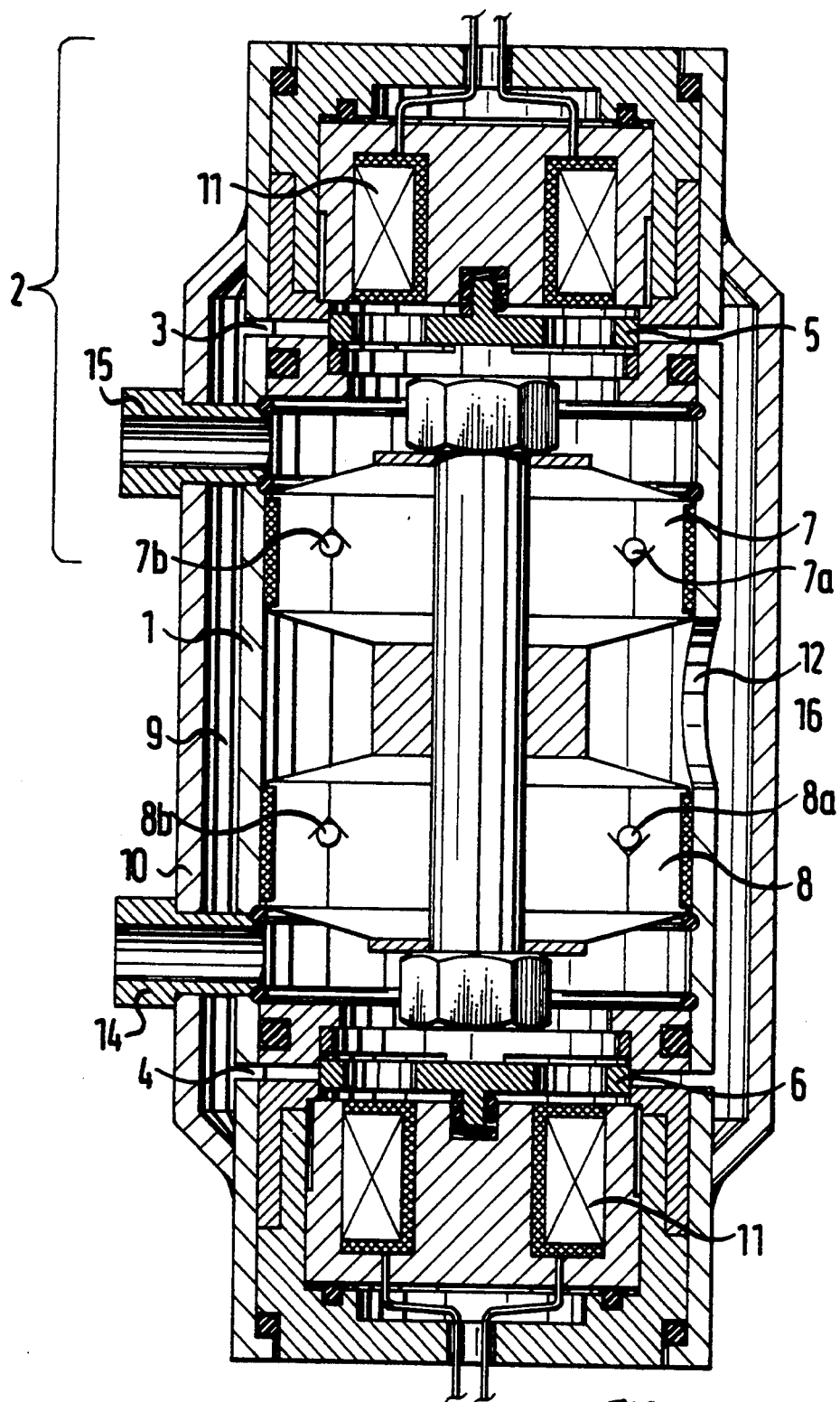
FIG. 4 illustrates a vibration-suppression valve system with fluid flowing through pressure-sensitive valves paralleling the axially displaced plungers.

When the fluid's level of vibration suppression is to be controlled by means of an external reservoir, the vibration-suppression valve system can be interposed between the dashpot's displacement compartments and the reservoir. Another embodiment of the vibration-suppression valve system is illustrated in FIG. 4. The fluid in this system flows through pressure-sensitive valves 7 and 8 paralleling the axially displaced plungers 5 and 6 that control outlets 3 and 4. Bores 14 and 15 both communicate with the inside 16 of the valve.

Figure 5D:
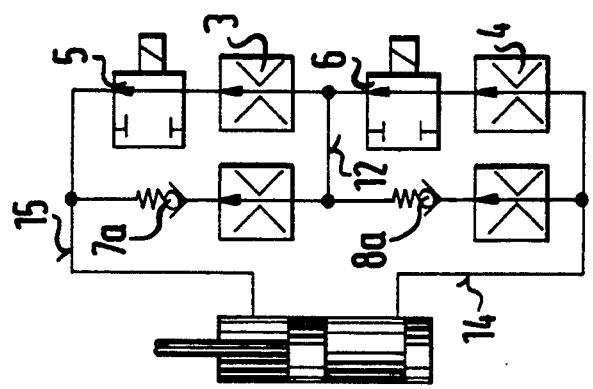
FIGS. 5a, 5b, 5c and 5d illustrate how the vibration-suppression valve system illustrated in FIG. 4 operates in the compression stage.
Figure 5C:
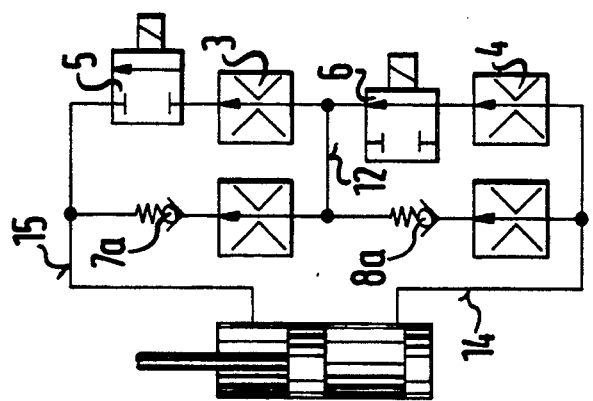
Figure 5B:
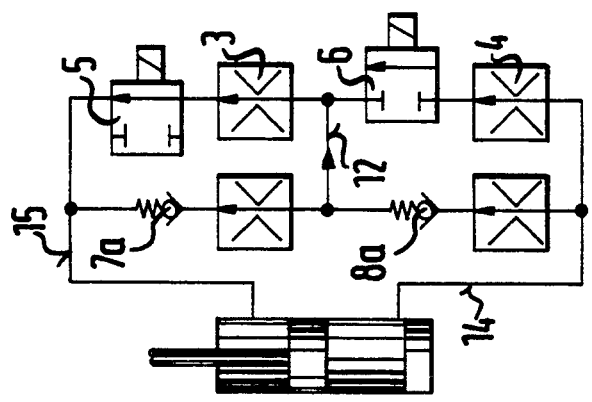
Figure 5A:
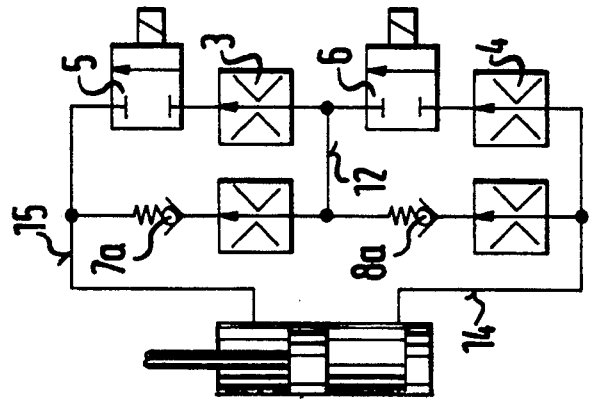

FIGS. 5a and 5b illustrate how the vibration-suppression valve system operates during the compression stage. Bore 15 communicates with the upper displacement compartment and bore 14 with the lower displacement compartment. With electromagnet 11 off, plungers 5 and 6 block outlets 3 and 4. The fluid entering through bore 14 now flows into bore 15, which acts as an outlet bore, only through the similarly oriented resilient-disk valves 8a and 7a.

Figure 6:
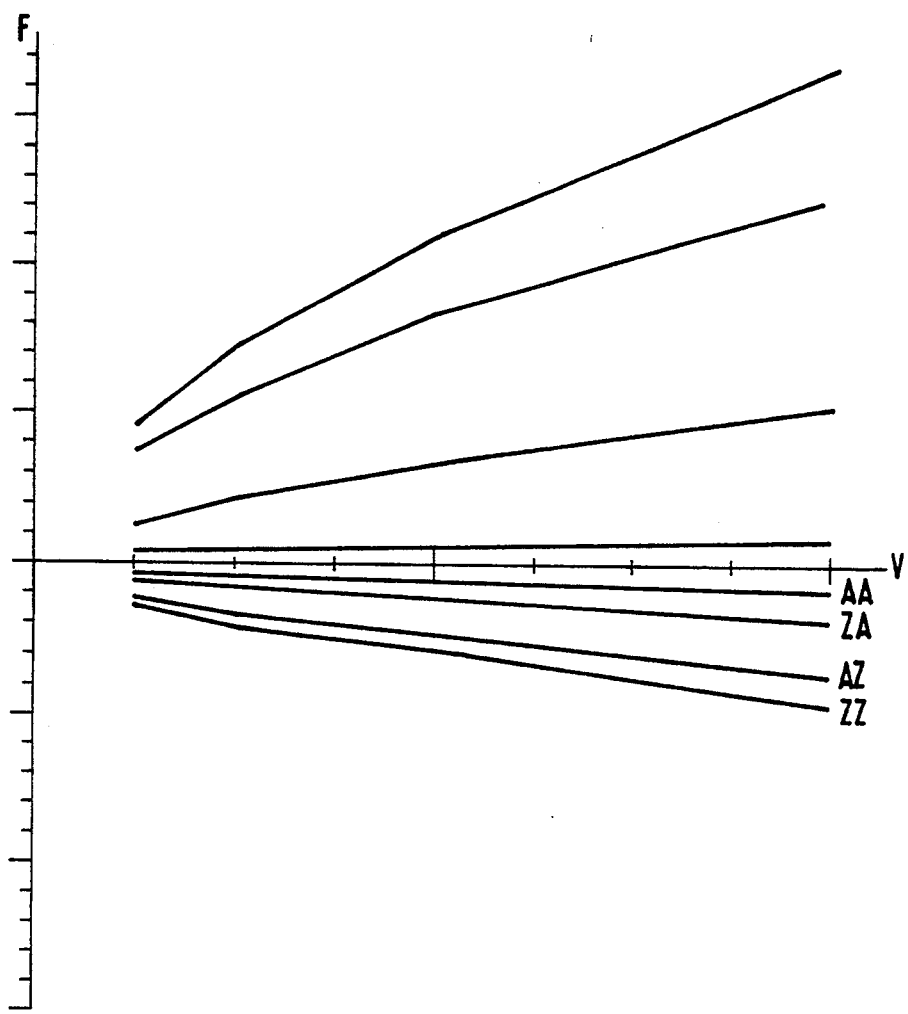
FIG. 6 illustrates characteristic curves attainable with the vibration-suppression valve system.

The resulting curve of the level of vibration suppression over piston speed (FIG. 6) represents the vibration-suppression valve system's hardest characteristic ZZ.

When plunger 5 unblocks outlet 3 while outlet 4 remains blocked (FIG. 5b), the fluid entering through bore 14 will flow into bore 15 through resilient-disk valve 8a, bypass channel 9, and outlet 3. The curve illustrated in FIG. 5 is the result.

When plunger 6 unblocks outlet 4 while outlet 3 remains blocked, the fluid entering through bore 14 will flow into bore 15 through outlet 4, bypass channel 9, outlet 12, the inside of the valve, and resilient-disk valve 7a, producing characteristic curve ZA. The softest, curve AA, occurs when both electromagnets are on and plungers 5 and 6 unblock outlets 3 and 4.

Figure 7:
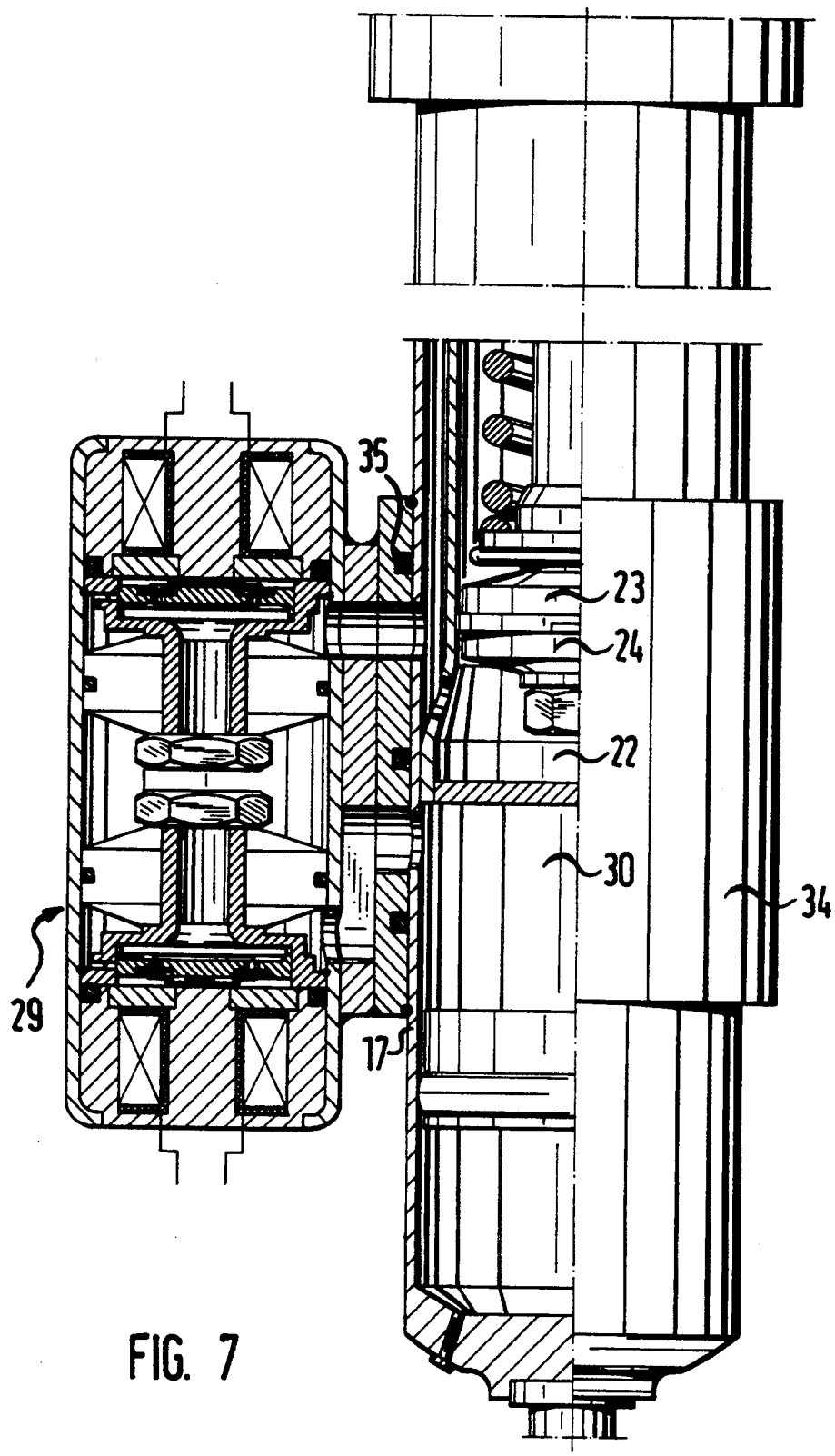
FIG. 7 illustrates another approach to varying the vibration-suppression level on a one-tube dashpot with the vibration-suppression valve system.

FIG. 7 illustrates another way of controlling a dashpot's level of vibration suppression with a vibration-suppression valve system 29 between lower displacement compartment 22 and an oil-equalization compartment 30. The vibration-suppression curve generated by the valve in this system is added to the curves generated by pressure-sensitive vibration-suppression valves 23 or 24.

Vibration-suppression valve system 29 is secured to cylinder 17 with a flange 34 and sealed off from the environment and against the wall of the cylinder with seals 35.

Figure 8:
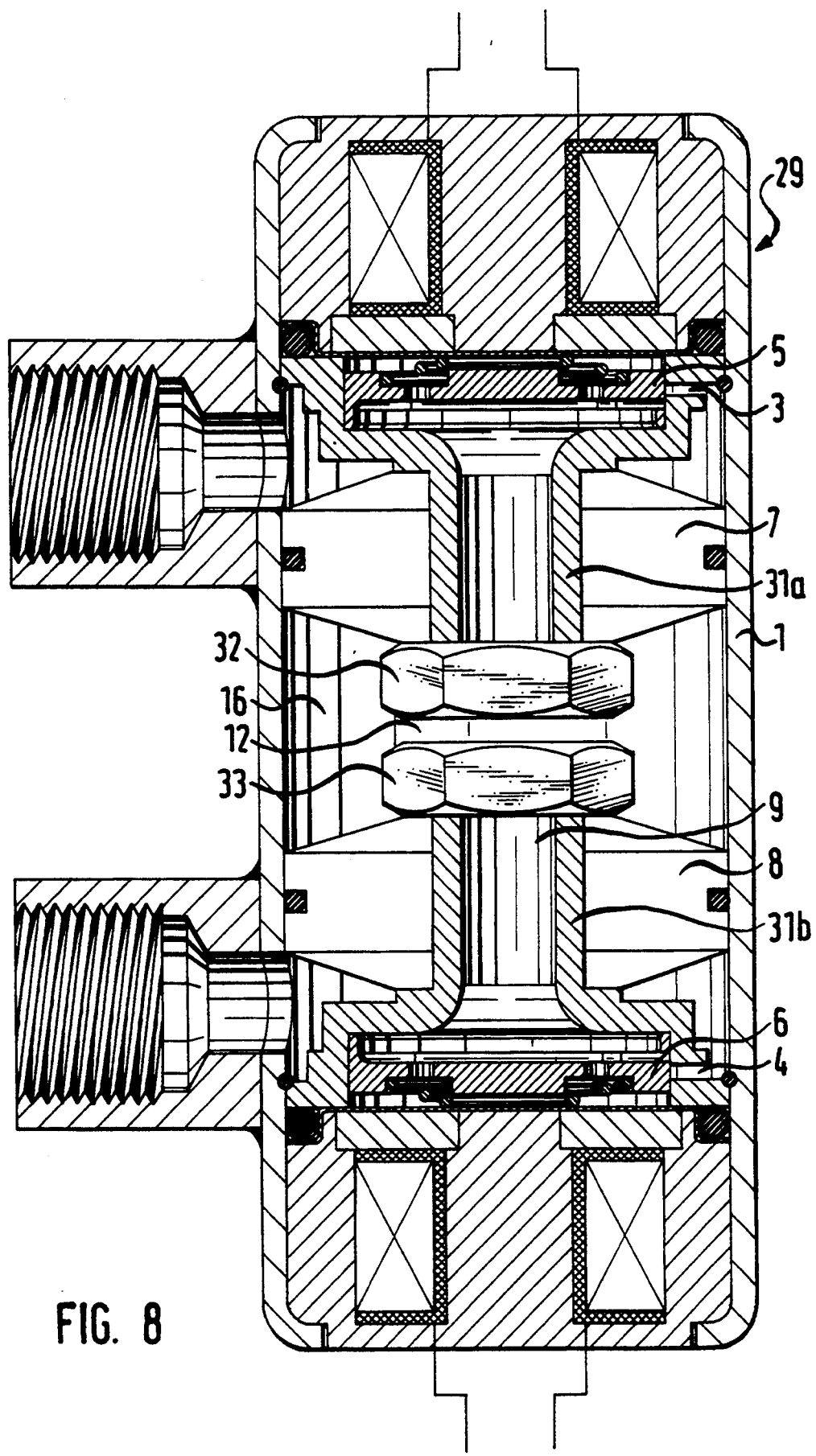
FIG. 8 illustrates another variation of the vibration-suppression valve system.

FIG. 8 illustrates another version of the vibration-suppression valve system, wherein fluid flows through pressure-sensitive valves 7 and 8 paralleling the axially displaced plungers 5 and 6. The bypass channel 9 in this embodiment is constituted by a tube 31 in housing 1 between the outlets 3 and 4 controlled by plungers 5 and 6. Tube 31 is sectioned between pressure-sensitive valves 7 and 8, providing an outlet 12 to the inside 16 of the valve. Tube sections 31a and 31b simultaneously support pressure-sensitive valves 7 and 8, which are secured with nuts 32 and 33.

Figure 9:
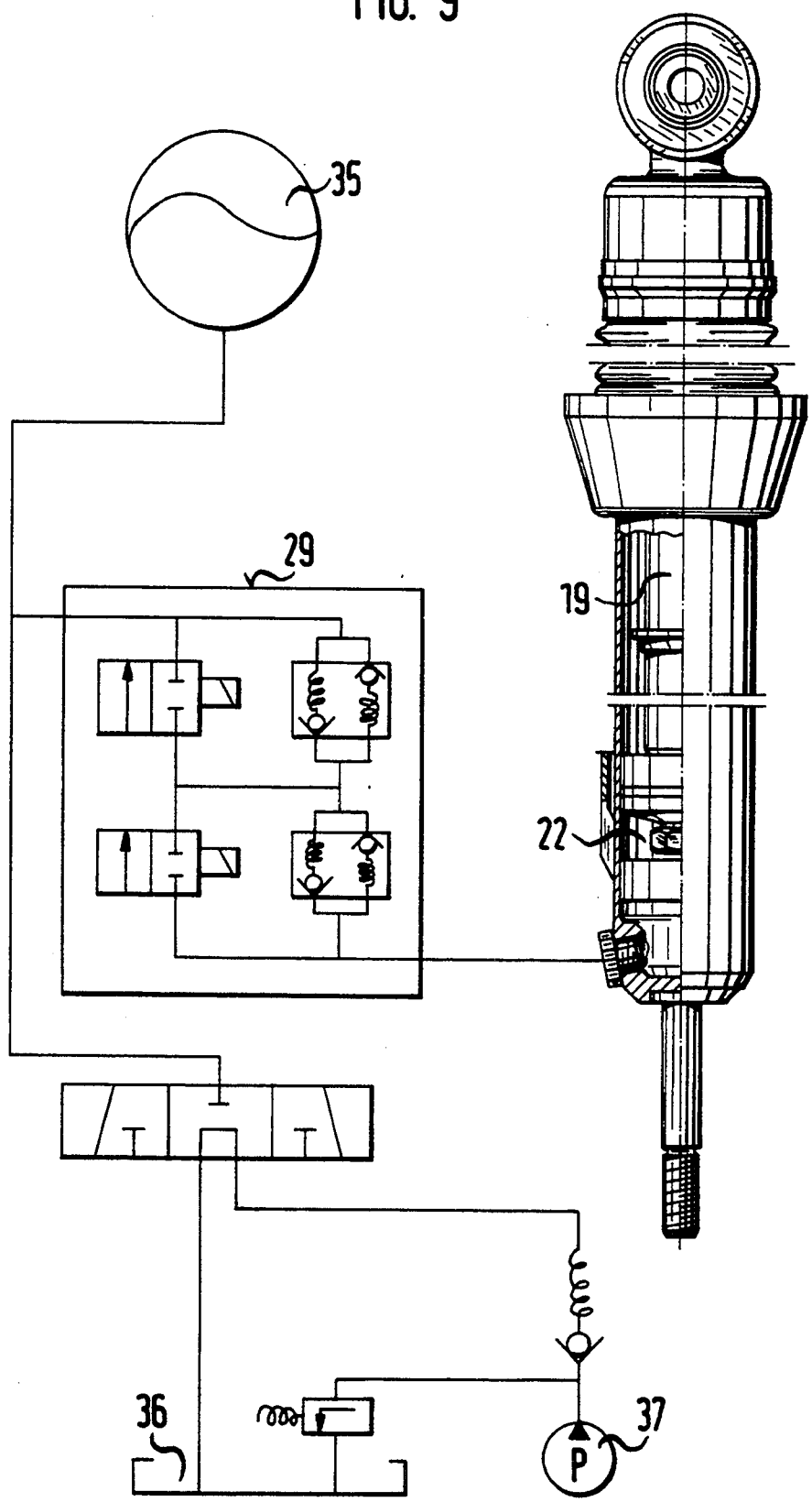
FIG. 9 illustrates a one-tube dashpot with level controls.

In controlling the level of a single-tube dashpot as well, the vibration-suppression valve system can be employed without any problem as represented in FIG. 9. When the vehicle is jacked up, fluid will be pumped into the dashpot's lower displacement compartment 22, and vibration-suppression valve system 29 will establish the corresponding curve. When the vehicle is suspended, fluid will be forced out of lower displacement compartment 22 and into a high-pressure reservoir 35 by vibration-suppression valve system 29 as it generates the adjusted level of vibration-suppression curve to compensate for the volume of the entering piston rod 19. To attain corresponding level regulation, the system also includes a supply tank 36, a pump 37, and the requisite controls.

Figure 10A:
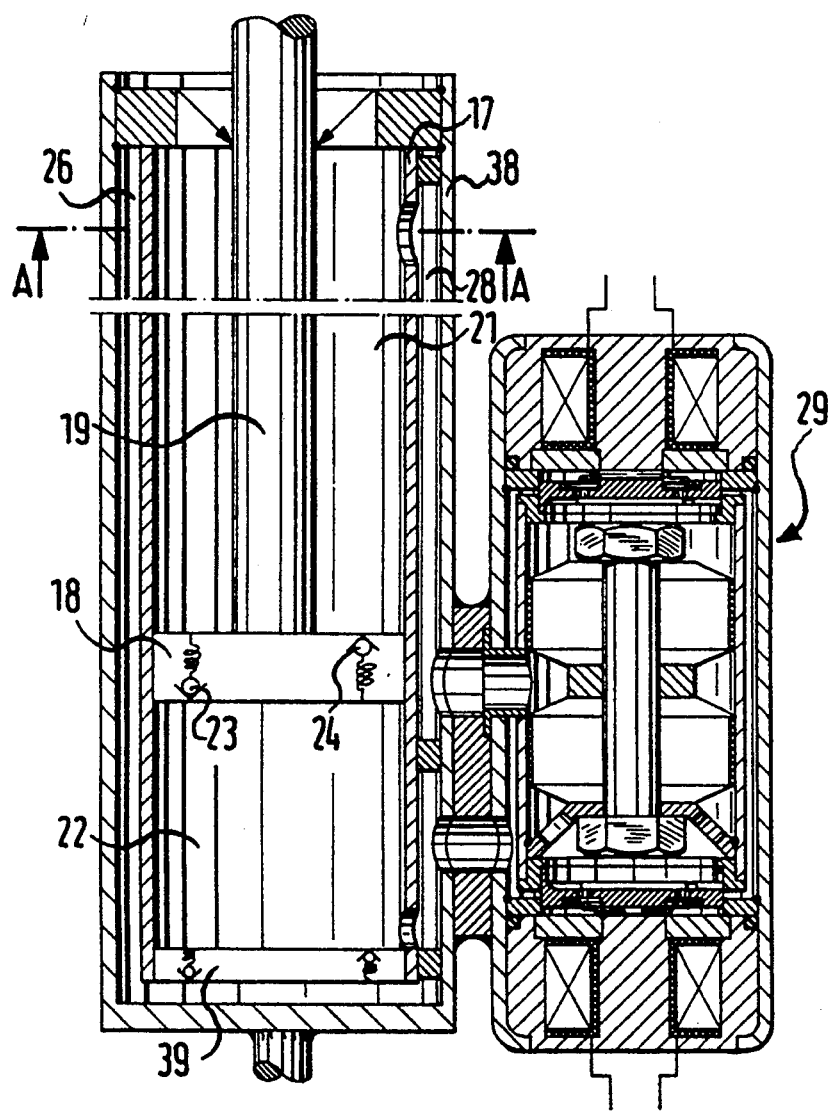
FIG. 10 illustrates a two-tube dashpot with two displacement compartments communicating through a vibration-suppression valve system.
Figure 10B:
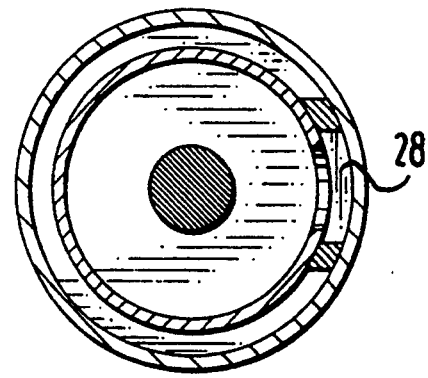

The two-tube dashpot illustrated in FIG. 10 consists essentially of a vibration-suppression cylinder 17 with a vibration-suppressing piston 18 attached to a piston rod 19 and having pressure-sensitive vibration-suppression valves 23 and 24 mounted on it traveling in and out. An external cylinder 38 is mounted concentrically around vibration-suppression cylinder 17, leaving an equalization compartment 26. Vibration-suppression cylinder 17 is divided into displacement compartments 21 and 22 by a vibration-suppressing piston 18. Lower displacement compartment 22 communicates with equalization compartment 26 through a valve 39 in the base, allowing compensation for the volume expelled by the entering piston rod 19.

Upper displacement compartment 21 communicates with lower displacement compartment 22 through channel 28 and through vibration-suppression valve system 29, which is currently acting as a bypass valve in relation to pressure-sensitive vibration-suppression valves 23 and 24.

It is on the other hand also possible to exploit the vibration-suppression valve system to create a variable communication for the fluid between upper displacement compartment 21 and equalization compartment 6 or between lower displacement compartment 22 and equalization compartment 26.

The vibration-suppression valve system is engaged to adapt the vibration-suppressing properties of the dashpot to the particular state of the vehicle or road conditions. Sensors determine the parameters, such as load, vehicle speed, body acceleration, etc.

Figure 11:
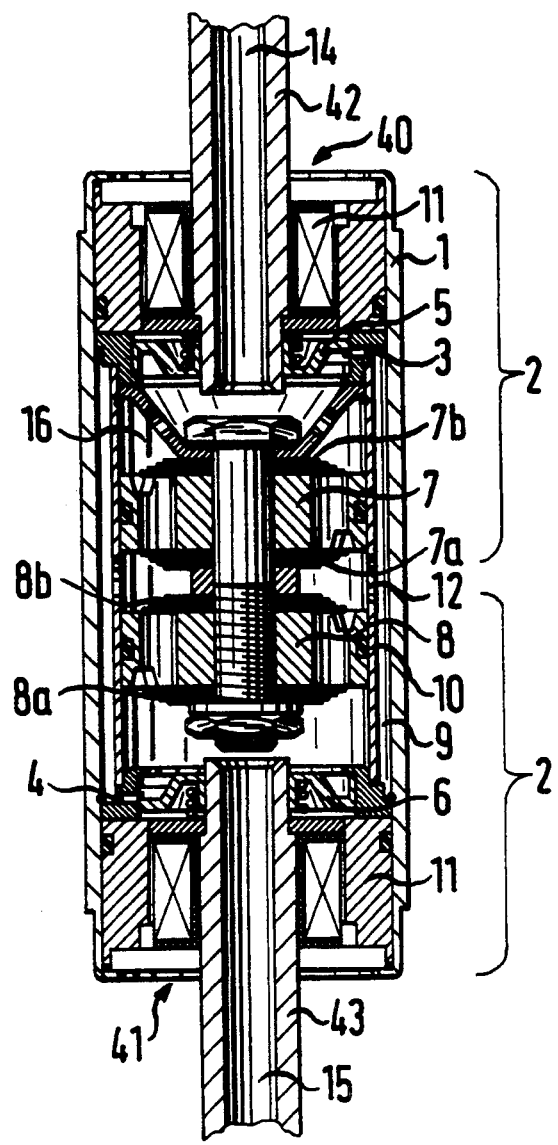
FIG. 11 is a cross-sectional view of another embodiment showing attenuating valves.

The system 29 of attenuating valves illustrated in FIG. 11 comprises a cylindrical valve housing 1 that accommodates two coaxially opposed shock-absorbing valves 2. Each shock-absorbing valve 2 comprises an electromagnetically displaced bolt 5 and 6 and a pressure-sensitive valve 7 and 8. Bolts 5 and 6 operate in conjunction with ports 3 and 4. Pressure-sensitive valves 7 and 8 comprise spring-loaded disk valves 7a & 7b and 8a & 8b that open and close in accordance with the pressure of the fluid. Bolts 5 and 6 are each moved subject to an electromagnet 11 and are positioned to ensure that ports 3 and 4 are closed when no current flows through the electromagnet and are open when current flows through it. In the event of such a malfunction as a power failure or broken cable accordingly, the dashpot's attenuating force will automatically shift to the hardest performance curve.

The flow channel 9 between the ports 3 and 4 that are adjusted by bolts 5 and 6 extends from the outer surface of a pipe 10 accommodated inside housing i and the inner surface of the housing. Pipe 10 simultaneously constitutes an interior accommodation 6 for pressure-sensitive valves 7 and 8. Flow channel 9 also accommodate at least one port 12 that opens between the valves into their interior accommodation 6.

The variable communication with the dashpot and, when it is employed in level regulation, with the level regulator, is by way of fluid-line connections 14 and 15. Connections 14 and 15 are in the form of sections 42 and 43 of pipe that fit into the ends 40 and 41 of system 29 of attenuating valves. In FIG. 11 both electromagnets 11 and annular bolts 5 and 6 surround sections 42 and 43. Fluid-flow connections 14 and 15 terminate in an accommodation 16 for pressure-sensitive valves 7 and 8 and accordingly constitute a direct communication between each pressure-sensitive valve and the ports 3 and 4 accordingly opened and closed by bolts 5 and 6.

When there is no current flowing through electromagnets 11, bolts 5 and 6 maintain ports 3 and 4 closed. The fluid flowing through fluid-line connection 14 for instance will accordingly flow downstream to fluid-line connection 15 only by of the disk valves 7a and 8a that yield in that direction. When bolt 5 opens port 3 while port 4 remains closed, the attenuating fluid entering through connection 14 will flow into flow channel 9 through port 3 and out through port 12, pressure-sensitive valve 8a, and connection 15. A third performance curve is produced when bolt 6 opens port 4 while port 3 is closed. In this event the fluid entering system 29 of attenuating valves through connection 14 will flow out through connection 15 by way of pressure-sensitive valve 7a, port 12, flow channel 9, and port 4. The softest performance curve occurs when current flows through both electromagnets 11 while bolts 5 and 6 leave ports 3 and 4 open. The whole procedure is reversed when fluid enters system 29 through connection 15.

Figure 12:
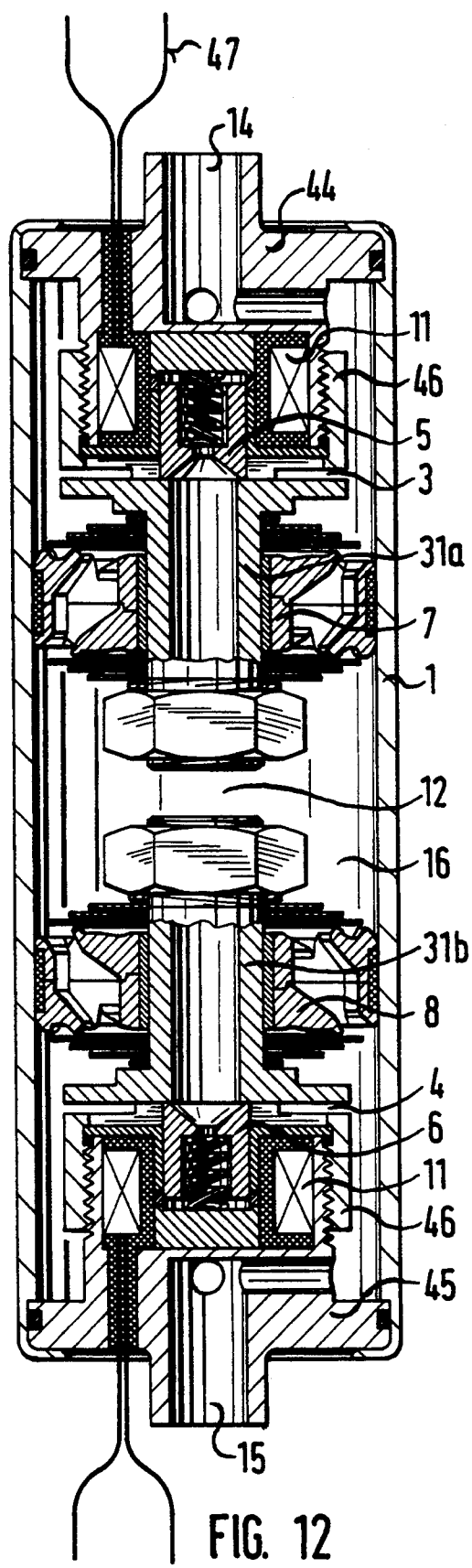
FIG. 12 is a cross-sectional view of still another embodiment of the system of attenuating valves.

FIG. 12 illustrates still another embodiment of the system of attenuating valves. Flow channel 9 is in this event represented by a pipe 31 accommodated in valve housing 1 between the ports 3 and 4 controlled by bolts 5 and 6. The port 12 leading into the interior accommodation 16 for pressure-sensitive valves 7 and 8 is constituted by a gap in pipe 31 between the valves. These valves are mounted on sections 31a and 31b of pipe 31. Fluid-line connections 14 and 15 are constituted in this embodiment by openings in the ends 44 and 45 of housing 1 and by channels between the housing 46 of electromagnets 11 and the inner surface of valve housing 15.

The ends 44 and 45 of housing 1 secure electromagnets 11 above housing 46. Electric connections 47 extend out through the ends.

Figure 13:
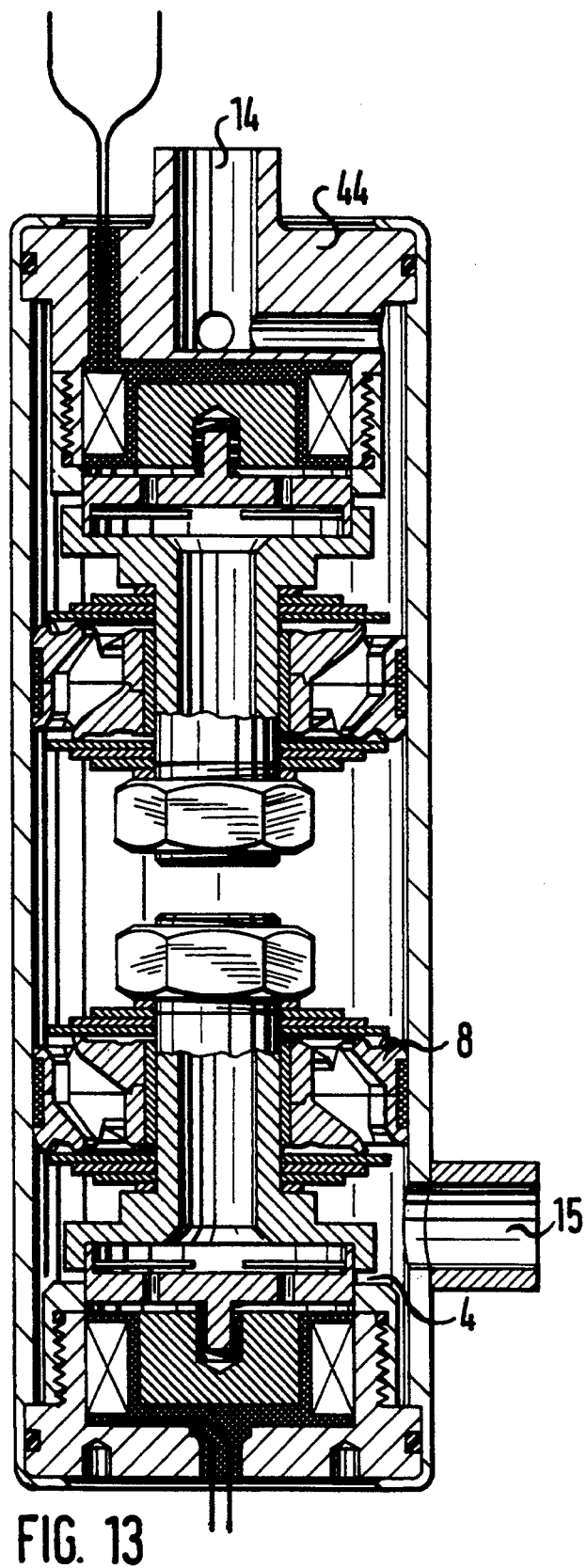
FIG. 13 is a cross-sectional view of another embodiment of FIG. 12.

FIG. 13 illustrates the system 29 of attenuating valves illustrated in FIG. 12 with a radial fluid-line connection 15 and an axial fluid-line connection 14 extending out of end 44. Connection 15 is positioned in this case between pressure-sensitive valve 8 and port 4.

Figure 14:
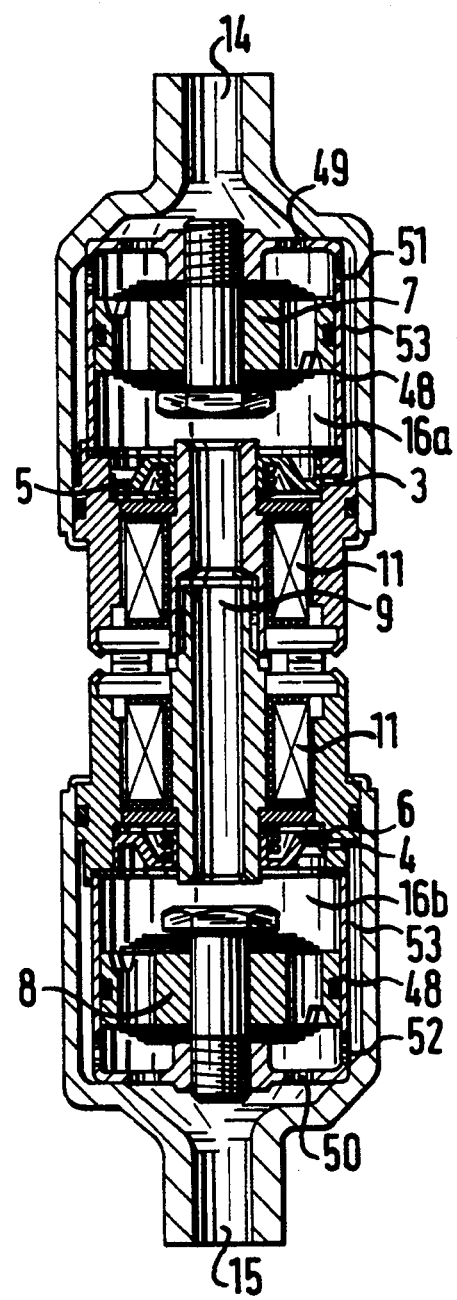
FIG. 14 is a cross-sectional view of a further embodiment, in accordance with the present invention.

The bolts 5 and 6 in the embodiment illustrated in FIG. 14 are accommodated axially and coaxially opposed along with their associated ports 3 and 4 and electromagnets 11 inside, and pressure-sensitive valve 7 and 8 axially out valve outside, the sectioned housing 1. Each pressure-sensitive valve 7 and 8 is in an associated accommodation 16a and 16b in the form of a housing 48. Direct communication between axial fluid-flow connections 14 and 15 and their associated pressure-sensitive valves 7 and 8 is established by at least one bore 49 and 50. Direct connection between fluid-line connections 14 and 15 and the ports 3 and 4 subject to bolts 5 and 6 is established through bore 49 or bore 50 in a housing 48, through at least one other bore 51 or 52, and a channel 53 between housing 48 and valve housing 1. The two attenuating valves 2 communicate through flow channel 9.

As long as bolts 5 and 6 keep ports 3 and 4 closed, fluid entering through fluid-line connection 14 will flow out by way of the bore 49 in pressure-sensitive valve 7, flow channel 9, pressure-sensitive valve 8, and bore 50 through fluid-line connection 15, producing the hardest performance curve. Another force-of-attenuation curve is generated when bolt 5 opens port 3. Fluid will in this event flow out through connection 15 by way of bore 49, interior valve accommodation 16a, bore 51, flow channel 53, port 3, flow channel 9, and pressure-sensitive valve 8. When bolt 6 opens port 4 while port 3 is left closed, the fluid will flow out through connection 15 by way of pressure-sensitive valve 7, flow channel 9, port 4, flow channel 53, and bores 52 and 50, generating a third curve. The softest curve occurs when ports 3 and 4 are both open, providing a bypass around pressure-sensitive valves 7 and 8. The fluid entering connection 14 will in this event flow out through connection 15 by way of the two open ports.

Figure 15:
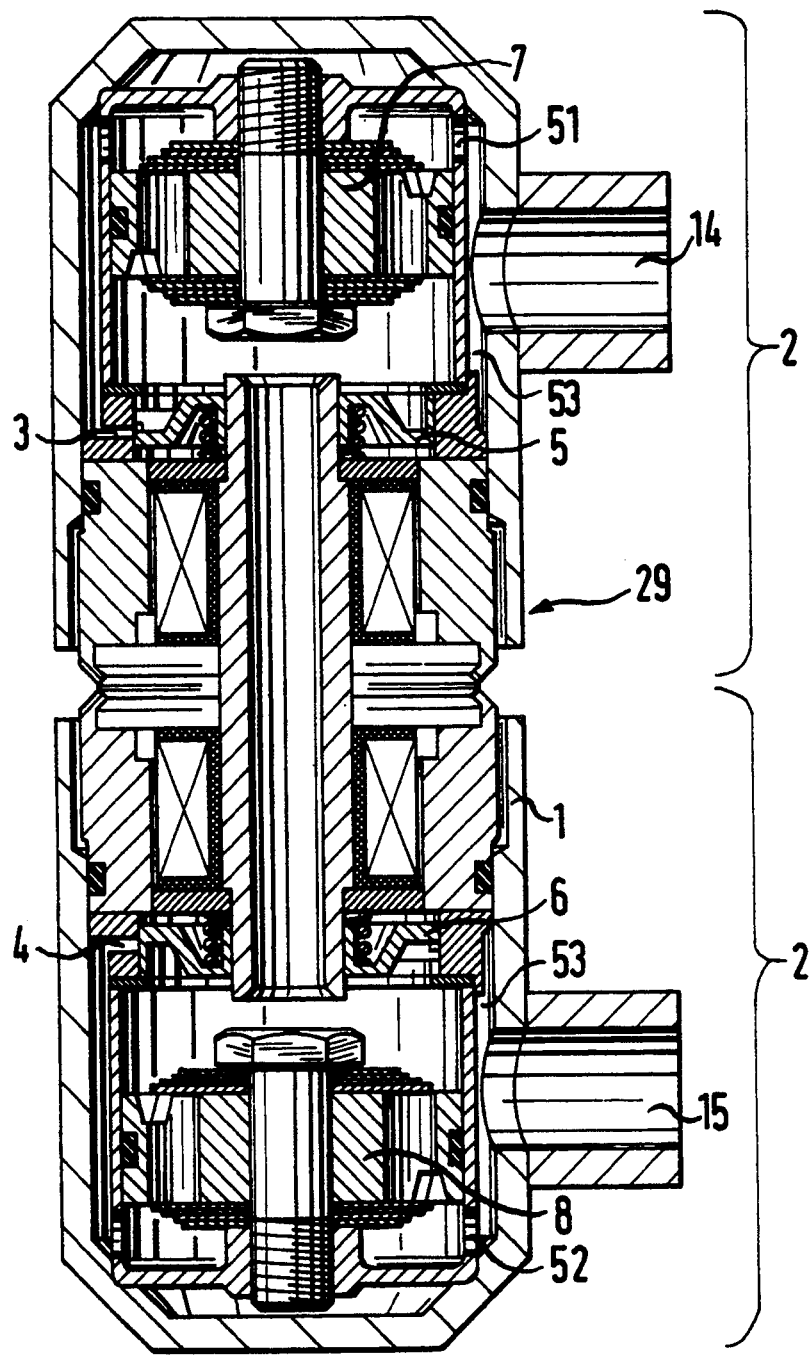
FIG. 15 is a cross-sectional view of a still further embodiment of the system of attenuating valves, according to the present invention.

The pressure-sensitive valves 7 and 8 are accommodated axially outside and the bolts 5 and 6 that open and close ports 3 and 4 axially inside in valve housing 1 in the system 29 of attenuating valves in the embodiment illustrated in FIG. 15. Fluid-flow connections 14 and 15 extend along the channel 53 of the particular attenuating valve 2 and accordingly communicate directly with ports 3 or 4 and, by way of bores 51 and 52, with pressure-sensitive valve 7 or 8.

We claim:

1. A variable dashpot for motor vehicles, comprising: a fluid-filled shock-absorbing cylinder; a piston rod with an end sliding back and forth inside said cylinder; a first piston mounted on said end of said piston rod, said first piston dividing said cylinder into two displacement sections; said first piston having valves sensitive to pressure variations during compression and suction phases, said first piston having also an exterior system of regulable attenuating valves determining the dashpot's attenuating force, said attenuating valves and said pressure-sensitive valves generating together four performance curves in each phase; each valve in said system of attenuating valves comprising further two valves mounted on a single body and a second piston for each said two valves displaced back and forth axially for opening and closing at least one part, one of said two valves being sensitive to pressure during a suction phase and the other of said two valves being sensitive to pressure during a compression phase, one said second piston opening and closing one port and the other second piston opening and closing another port; said attenuating valves being positioned oppositely and coaxially in a cylindrical valve housing comprising at least one of said sections; the second pistons establishing communications between said attenuating valves and one of two fluid-line connections by the second pistons so that at least one of said two pressure-sensitive valves will participate in attenuation and neither of said two pressure-sensitive valves will participate in attenuation; and electromagnetic means for displacing the second pistons.

2. A variable dashpot as defined in claim 1, wherein said second pistons are axially displaced by said electromagnetic means and are located axially outside, said pressure-sensitive valves being axially inside said valve housing.

3. A variable dashpot as defined in claim 2, including at least one channel in said system of attenuating valves to convey fluid between said ports opened and closed by said second pistons.

4. A variable dashpot as defined in claim 3, wherein said channel comprises a pipe surrounding said valve housing demarcating and interior valve receiving means.

5. A variable dashpot as defined in claim 3, wherein said channel is between an outer surface of a pipe inside said valve housing and an inner surface of said housing, said pipe comprising an interior valve receiving means for said pressure-sensitive valves.

6. A variable dashpot as defined in claim 3, wherein said channel is a pipe inside said valve housing and between said ports opened and closed by said second pistons, said pressure-sensitive valves being mounted on said pipe.

7. A variable dashpot as defined in claim 3, wherein said channel has at least one port position axially between said pressure-sensitive valves and opening into an interior valve receiving means, one of said fluid-line connections communicating directly with one pressure-sensitive valve and one of said ports, another one of said fluid-line connections communicating directly with another pressure-sensitive valve and another port.

8. A variable dashpot as defined in claim 7, wherein said fluid-line connections extend radially out of said valve housing.

9. A variable dashpot as defined in claim 7, wherein at least one of said fluid-line connections extends axially into said system of attenuating valves.

10. A variable dashpot as defined in claim 7, wherein said system of attenuating valves includes at least two axial fluid-line connections.

11. A variable dashpot as defined in claim 3, wherein one of said fluid-line connections opens into said channel and another one of said fluid-line connections between said pressure-sensitive valves opens into an interior valve receiving means.

12. A variable dashpot as defined in claim 11, wherein said fluid-line connections extend radially into said valve housing.

13. A variable dashpot as defined in claim 11, wherein one of said fluid-line connections extends axially into said system of attenuating valves.

14. A variable dashpot as defined in claim 1, wherein said electromagnetically displaced second pistons that open and close at least one port are located axially inside and said pressure-sensitive valves are located axially outside in said valve housing.

15. A variable dashpot as defined in claim 14, wherein said system of attenuating valves includes at least one channel conveying fluid between said ports that are opened and closed by said second pistons.

16. A variable dashpot as defined in claim 15, wherein said channel is a pipe surrounding said valve housing.

17. A variable dashpot as defined in claim 15, wherein said channel is in a space between an inner surface of said valve housing and an outer surface of a pipe located therein.

18. A variable dashpot as defined in claim 15, wherein said channel is located between said attenuating valves and extends through the electromagnetically displaced second pistons.

19. A variable dashpot as defined in claim 15, wherein one of said fluid-line connections communicates directly with one pressure-sensitive valve and one port and another fluid-line connection communicates directly with another pressure-sensitive valve and another port.

20. A variable dashpot as defined in claim 15, wherein said fluid-line connections extend radially out of said valve housing.

21. A variable dashpot as defined in claim 15, wherein at least one of said fluid-line connections is axial.

22. A variable dashpot as defined in claim 1, wherein fluid flow takes place through said fluid-line connection either upstream or downstream.

23. A variable dashpot as defined in claim 1, wherein said second pistons are displaced axially by said electromagnetic means.

24. A variable dashpot as defined in claim 23, wherein said second pistons and electromagnetic means comprises together solenoids.

25. A variable dashpot as defined in claim 23, including a spring for forcing said second pistons to keep said ports closed as long as no current flows through said electromagnetic means.

26. A variable dashpot as defined in claim 1, wherein said system of attenuating valves varies the width of a bypass between said displacement sections of said cylinder.

27. A variable dashpot as defined in claim 1, wherein said system of attenuating valves varies the width of a bypass between one said cylinder's displacement sections and a displacement-compensation section.

28. A variable dashpot as defined in claim 1, wherein at least one of said displacement sections regularly communicates with an external reservoir of compressed fluid through said system of attenuating valves.

29. A variable dashpot as defined in claim 1, wherein said system of attenuating valves rests tight through a flange against selectively said shock-absorbing cylinder and an outer cylinder.

30. A variable dashpot as defined in claim 1, wherein said system of attenuating valves is fastened to said shock-absorbing cylinder or to an outer cylinder.

31. A variable dashpot for motor vehicles, comprising:
a fluid-filled shock-absorbing cylinder; a piston rod with an end sliding back and forth inside said cylinder; a first piston mounted on said end of said piston rod, said first piston dividing said cylinder into two displacement sections; said first piston having valves sensitive to pressure variations during compression and suction phases, said first piston having also an exterior system of regulable attenuating valves determining the dashpot's attenuating force, said attenuating valves and said pressure-sensitive valves generating together four performance curves in each phase; each valve in said system of attenuating valves comprising further two valves mounted on a single body and a second piston for each said two valves displaced back and forth axially for opening and closing at least one part, one of said two valves being sensitive to pressure during a suction phase and the other of said two valves being sensitive to pressure during a compression phase, one said second piston opening and closing one port and the other second piston opening and closing another port; said attenuating valves being positioned oppositely and coaxially in a cylindrical valve housing comprising at least one of said sections; the second pistons establishing communications between said attenuating valves and one of two fluid-line connections by the second pistons so that at least one of said two pressure-sensitive valves will participate in attenuation and neither of said two pressure-sensitive valves will participate in attenuation; and electromagnetic means for displacing the second pistons; said second pistons being axially displaced by said electromagnetic means and being located axially outside, said pressure-sensitive valves being axially inside said valve housing; at least one channel in said system of attenuating valves to convey fluid between said ports opened and closed by said second pistons; said channel comprising a pipe surrounding said valve housing demarcating an interior valve receiving means; said fluid-line connections extending radially out of said valve housing; one of said fluid-line connections opening into said channel and another one of said fluid-line connections between said pressure-sensitive valves opening into an interior valve receiving means; said electromagnetically displaced second pistons opening and closing at least one port being located axially inside and said pressure-sensitive valves being located axially outside in said valve housing; said system of attenuating valves including at least one channel conveying fluid between said ports that are opened and closed by said second pistons; said channel being in a space between an inner surface of said valve housing and an outer surface of a pipe located therein; said system of attenuating valves varying the width of a bypass between said displacement sections of said cylinder.

* * * * *